United States Patent Office

3,099,605
Patented July 30, 1963

3,099,605
DIAGNOSTIC COMPOSITION
Alfred H. Free, Elkhart, Ind., assignor to Miles Laboratories, Inc., Elkhart, Ind., a corporation of Indiana
No Drawing. Filed Feb. 1, 1960, Ser. No. 5,649
11 Claims. (Cl. 195—103.5)

This invention relates to a novel method and means for the detection and estimation of chemical compounds.

In general the novel method and means of this invention involve the use of a composition which contains a specific enzyme for the substance sought to be identified, together with suitable compounds for the identification of hydrogen peroxide which is a product of the initial reaction. The hydrogen peroxide is conveniently identified by its interaction with peroxidase and an indicator system.

The invention is based on a new concept, and has for one of its primary objects the provision of a new type of analytical technique, method and composition having practical usefulness in a variety of scientific yields. As will be seen hereinafter, my invention is applicable to the determination of a large number of compounds, and will be illustrated in particular detail with respect to the determination of the glucose content of materials, wherein one of the most important applications is in detecting glucose in body fluids such as urine.

Though, generally speaking, the techniques of this invention are applicable to the detection and estimation of materials which will react with oxygen in the presence of specific enzymes, resulting in the production of oxidized derivatives of those materials, and hydrogen peroxide, the invention is particularly applicable to the determination of, besides glucose, such compounds as L-amino acids, D-amino acids, hypoxanthine, xanthine, glycine, monoamines, diamines, uric acid, luciferin, D-aspartic acid, aliphatic aldehydes, aromatic aldehydes, lactic acid, and the like.

By way of particularizing the invention, there is provided a description of the invention with respect to determination of glucose in urine, it being understood, of course, that the principles of the invention are applicable to the determination of a wide variety of materials as above pointed out.

The determination of glucose in urine—illustrative of one embodiment of my invention as above pointed out—is of great importance, not only to diabetic patients who must control their sugar input, but is essentially involved in those situations where large numbers of people are "screened" to determine the incidence of diabetes among them.

In preparing a composition, in accordance with my invention, which is to be used for the detection of glucose, I make a suspension or solution composed of two enzymes (which will be described in further detail hereinafter), an indicator whose color is affected by hydrogen peroxide in the presence of one of these enzymes, and in addition to the foregoing a buffer to keep the pH of the reactants at the site of reaction within a predetermined range, a stabilizer such as gelatin or other soluble protein, or soluble starch, and if desired in certain circumstances, a dye to make color reading easier.

The enzymes used are glucose aero-dehydrogenase, also known as glucose oxidase, which is capable of converting glucose to gluconic acid in the presence of atmospheric oxygen and at the same time of forming hydrogen peroxide, and secondly, an enzyme which is commonly called peroxidase although the term catalase, may while commonly used for a different type of action on hydrogen peroxide, in some instances be applied to this enzyme. The latter is capable of oxidizing certain substances such as oxidizable dyes, when it is present together with such dye and hydrogen peroxide.

The resulting suspension or solution may be used to impregnate bibulous materials such as paper, wood, fibre or the like having any desired size or shape; such a product after drying (though drying is not essential) will undergo a distinct color change when contacted with glucose-containing material, e.g. urine.

This composition may also be suitably applied to splinters, sticks or strips, made of wood, fibre, paper, glass, metal or plastic using, for example, gelatin or similar adhesive materials for effecting adhesion. Such "sticks" will turn color when moistened with a glucose containing fluid.

A composition such as this may also be formed into a tablet, and used by applying the fluid to be tested to the tablet, e.g. placing a drop or two of suspect urine on the face of the tablet; if glucose is present in the urine, the tablet, or at least a portion thereof will turn color.

The following detailed examples will serve further to document a number of specific embodiments of this invention and illustrate its flexibility; these embodiments have been chosen as illustrative of my invention and it will be quite apparent that various modifications may be made without departing from the spirit and scope of the invention.

*Example I*

A mixture was prepared containing:

Orthotolidine dihydrochloride _____mg__ 100
Glucose oxidase _____mg__ 200
Peroxidase _____mg__ 5
Gelatin _____mg__ 200
A buffer composed of a mixture of anhydrous citric
  acid and trisodium citrate·$2H_2O$, ground together
  in a mortar in a ratio of 31:66 by weight ___gm__ 2
F.D. and C. soluble Red No. 3 _____mg__ 5

In preparing this mixture, the gelatin was dissolved in 5 ml. of boiling water and cooled to room temperature. The 2 gm. of solid buffer was suspended in 5 ml. of water and mixed with the gelatin to give a clear solution. The orthotolidine dihydrochloride was dissolved in 5 ml. of water and added to the above mixture, and immediately then there was added 2.5 ml. of water containing the peroxidase and glucose oxidase and 2.5 ml. of water containing the dye. This was mixed and filter paper strips were dipped in it. Each strip measured 2 inches by ¼ inch and the strips were air dried or vacuum dried after the dipping. When immersed in a solution containing glucose (such as urine) the strips turned blue in less than one minute.

Variations of the foregoing ingredients are, of course, possible within the skill of the art. For example, the orthotolidine dihydrochloride content may vary from 20 to 200 parts; the peroxidase content is also variably present in from 1 up to 100 parts. (This is an expensive ingredient and ordinarily it is unnecessary to use more than about 5 parts of this material in this particular formulation.) The glucose oxidase may vary from 25 to 500 parts. The gelatin content may be up to 1000 parts, the upper limit being dictated by the absorption properties imparted to the composition; too much gelatin naturally retards absorption of urine into the test composition and slows up and interferes with the test; ordinarily it is preferred that from 50 to 500 parts of gelatin be present. Sufficient buffer should be used to "dominate" the pH of urine, so that the pH of the composition where the reactions occur ranges from about pH 4 to about pH 6, preferably, about pH 5. About 5 parts of dye are ordinarily sufficient, although since the dye in any event functions to mask discolorations in the bibulous strip, or stick brought about by air, heat or light, variable amounts may be required; a quantity sufficient to give a light color should be used. Besides F.D. and C. Red #3, I can use other dyes like D. and C. Yellow #3. In fact almost any contrasting color can be used, to contrast with the color assumed by the indicator of choice. For instance if the indicator is o-tolidine, which causes a deep blue color to be formed when the test composition strip, stick or tablet is contacted with a positive urine, then the dye should be any color but blue, purple or green.

It will be understood that a number of buffer systems are available, and well known in the art, which will "dominate" the urine and effect a pH at the site of the reaction between about pH 4 and pH 6, preferably, about pH 5.

*Example II*

The following mixture was prepared:

| | |
|---|---|
| Glucose oxidase | mg 200 |
| Peroxidase | mg 5 |
| Orthotolidine dihydrochloride | mg 200 |
| Gelatin | mg 100 |
| Water | ml 15 |

This suspension was used to impregnate strips of bibulous filter paper (Easton and Dikeman #623-026). One hundred strips were made from this suspension, each strip measuring approximately 2 inches by ¼ inch. After drying—air or vacuum—and immersion in glucose-containing urine, the strips turned blue in less than a minute.

*Example III*

A mixture having the following composition was prepared:

| | |
|---|---|
| Glucose oxidase | mg 200 |
| Peroxidase | mg 5 |
| Orthotolidine dihydrochloride | mg 200 |
| Potassium acid phthalate | mg 816 |
| Gelatin | mg 100 |
| Water | ml 20 |

Strips of bibulous paper were prepared by the procedure described in the foregoing examples, and turned blue when contacted with glucose-containing solutions.

*Example IV*

A mixture having the following composition was prepared:

| | |
|---|---|
| Glucose oxidase | mg 200 |
| Peroxidase | mg 5 |
| Orthotolidine dihydrochloride | mg 200 |
| 2 N pH 5.5 phthalate buffer | ml 5 |
| Gelatin | mg 100 |
| Water | ml 15 |

The mixture was used to prepare test strips by the foregoing procedure; the strips after drying gave a sharp blue color when immersed in glucose positive urine.

*Example V*

A solution containing the following was prepared:

| | |
|---|---|
| Glucose oxidase | mg 50 |
| Peroxidase | mg 5 |
| Orthotolidine dihydrochloride | mg 450 |
| Sodium acetate | mg 100 |
| Water | ml 20 |

The foregoing mixture was used to prepare test strips by the foregoing procedure, which gave similar results when immersed in glucose-containing urine.

*Example VI*

A mixture having the following composition was prepared:

| | |
|---|---|
| Glucose oxidase | mg 200 |
| Peroxidase | mg 5 |
| Orthotolidine dihydrochloride | mg 200 |
| Water | ml 20 |

This mixture was used to impregnate filter paper strips which previously had been impregnated with benzoic acid. In this treatment 20 ml. of ether was mixed with 5 gm. of benzoic acid. The ether was evaporated from the strips and the excess of benzoic acid on the other surface of the strip was brushed off; the finished strips were then ready for use in testing for urine as disclosed in Example I.

*Example VII*

One hundred strips of filter paper, 2 inches by ¼ inch wide were impregnated with nicotinic acid by dipping the strips in a solution made by dissolving one gram of nicotinic acid in 20 ml. of hot water. The strips were then dried in an oven, and subsequently impregnated with a mixture having the following composition:

| | |
|---|---|
| Glucose oxidase | mg 200 |
| Peroxidase | mg 5 |
| Orthotolidine dihydrochloride | mg 200 |
| Water | ml 20 |

After drying, the strips were used for testing for glucose in the same manner as described in Example I.

*Example VIII*

A composition in powder form was prepared having the following components:

| | Mg. |
|---|---|
| Glucose oxidase | 200 |
| Peroxidase | 5 |
| Orthotolidine dihydrochloride | 200 |
| Boric acid | 1600 |

A drop of glucose-containing solution (e.g. urine) was placed on a square filter paper and a small amount of the above powder mixture placed on the moist area. The filter paper turned to blue when one or two drops of water were added to the powder.

*Example IX*

Another powder composition was prepared having the following components:

| | Mg. |
|---|---|
| Glucose oxidase | 200 |
| Peroxidase | 5 |
| Orthotolidine dihydrochloride | 200 |
| Citric acid-sodium carbonate (ratio of 64 parts citric acid to 18 parts sodium carbonate by weight) | 1600 |

This effervescent mixture was used for testing as in Example VIII.

*Example X*

The powder compositions described in Examples VIII and IX above were made into tablets and the tablets then used to detect glucose, in either of two ways as follows:

A. A filter paper square was moistened with a drop of glucose-containing solution, a tablet then placed on the moistened area and two drops of water allowed to flow over it. A blue color developed on the paper.

B. The tablet was moistened with a drop of solution tested and turned blue when glucose was present.

*Example XI*

A small piece of wooden applicator stick was coated with a 33% gelatin solution which acted as an adhesive and also as a specific compound enhancing the reaction. The stick was then rolled or immersed in either of the powder compositions described in Example IX or X; the "stick" turned blue when dipped into a solution containing glucose.

*Example XII*

A small envelope measuring ½ inch wide and 2 inches long was filled with the powder composition described in Example VIII or IX. The envelope was then sealed and could be used for testing for glucose by merely dipping it in the solution. In the presence of glucose, the envelope developed a blue color.

*Example XIII*

Powders or tablets such as described in Examples VIII, IX or X may be used to test for glucose on a paper previously dipped in a glucose-containing solution and allowed to dry. This procedure has the advantage in that it facilitates obtaining a sample at one place and testing it at a later time and at another place.

A striking characteristic of bibulous strips impregnated with those of the foregoing compositions that contained gelatin as a component was the absence of what I call "banding." In those examples where the bibulous paper strip was impregnated with a composition that did not contain gelatin as a component, the blue color that occurred when the strip was contacted with glucose-containing urine was not as sharp, deep, or as clearly defined as with the strips made with the gelatin-containing compositions, and the color in the former case was in the form of a "band" which was rather poorly defined and had migratory fringe areas of more or less inconclusive color quality, shade and depth. When, on the other hand, gelatin was present in the formulation, the resulting bibulous strip on being contacted with glucose-containing urine developed a surprisingly deep, sharply defined and unmistakable color wherever the glucose-containing urine contacted the treated portion of the strip. This, of course, is eminently desirable in that it makes a positive reading easier to make and eliminates what might otherwise be doubtful determinations.

While gelatin is the preferred agent for preventing the aforesaid banding phenomenon, other materials having utility in this regard are, for example, glutamic acid, glycine, and other protein degradation products like polypeptides, proteoses and the like.

The preferred indicator component of my composition is o-tolidine, conveniently as the dihydrochloride; other indicators which can be used are those represented by meta-toluidine, mixtures of benzidine and guaiacol, and 2,7-diaminofluorene.

In the foregoing examples the particular glucose oxidase used had an activity of about 2600 units per gram, a unit being by definition that quantity of enzyme which will cause a rate of oxygen uptake of 10 cubic mm. of oxygen at 30° C. by a solution of glucose contained in a Warburg flask. The peroxidase used was obtained from horseradish and its activity was of about the same order as that of the hemoglobin of blood.

There is a wide variability possible in the ratio of glucose oxidase and peroxidase which can be used in preparing the compositions used in the practice of my invention. For example, the glucose oxidase content can be increased as much as one hundred times and decreased to even 1/10 of the amount described and still provide a functional testing device. And it is necessary only that there be sufficient oxidase to catalyze the oxidation of the glucose and enough peroxidase so that it can exercise its own enzyme activity.

And, of course, my invention in any of its various forms e.g., as paper strip or similar bibulous material containing the enzymes, buffers, indicators and the gelatin, or as the tablet or powder can be used to determine the glucose content of not only body fluids (including blood serum, whole blood, urine and the like) but any glucose-containing fluid which does not possess inhibitors for the enzymes, glucose oxidase and peroxidase, or will not otherwise interfere with the reaction.

The following examples will further illustrate the flexibility and wide applicability of the concept of my invention to the determination and detection of compounds other than glucose.

*Example XIV*

L-amino acid oxidase (prepared from snake venom) is prepared with orthotolidine dihydrochloride and peroxidase and a suitable buffer. This mixture may be used in any of the several ways indicated above in Examples I to XIII. When moistened with a solution containing L-amino acid the composition will develop a blue color.

*Example XV*

D-amino acid oxidase (prepared from mammalian kidneys) is mixed with orthotolidine dihydrochloride and peroxidase and a suitable buffer. This composition can be employed in any of the ways suggested in Example I to XIII. The composition when moistened with a solution containing D-amino acid will develop a blue color which is a specific test for D-amino acid.

*Example XVI*

Xanthine oxidase (prepared from milk) is mixed with orthotolidine dihydrochloride and peroxidase and a suitable buffer. This composition can be used in any of the ways indicated in Examples I to XIII. When the composition is moistened with a solution containing either hypoxanthine or xanthine, a blue color will develop which is a specific test for these substances.

*Example XVII*

Glycine oxidase (prepared from pig kidney) is mixed with orthotolidine dihydrochloride and peroxidase and a suitable buffer. This composition can be used in any of the ways described in Examples I to XIII. The composition when moistened with a solution containing glycine will develop a blue color. This is a specific test for glycine.

*Example XVIII*

Monoamine oxidase (prepared from mammalian liver or kidney) is mixed with orthotolidine dihydrochloride and peroxidase and a suitable buffer. The composition can be used in any of the methods described in Examples I to XIII. When moistened with a solution containing monoamines, which include aliphatic amines, adrenaline, mescaline, and several other similar compounds, it will develop a blue color which is a specific test for these particular materials.

*Example XIX*

Diamine oxidase (prepared from pig kidney) is mixed with orthotolidine dihydrochloride and peroxidase and a suitable buffer. This mixture can be employed in any of the preparations described in Examples I to XIII. The composition when moistened with a solution containing any of several diamines, outstanding of which is histamine, will develop a blue color which is a specific test for this group of compounds.

*Example XX*

Uricase (prepared from mammalian liver or kidneys) is mixed with orthotolidine dihydrochloride and peroxidase and a suitable buffer. This composition can be employed in any of the ways suggested in Examples I to XIII. When the composition is moistened with a solution containing uric acid it will develop a blue color. This is a specific test for uric acid.

*Example XXI*

Luciferase (prepared from certain molds or bacteria) is mixed with orthotolidine dihydrochloride and peroxidase and a suitable buffer. The composition can be employed in any of several ways indicated in Examples I to XIII. This composition when moistened with a solution containing luciferin will develop a blue color. This is a specific test for luciferin.

Example XXII

D-aspartic acid oxidase is mixed with orthotolidine dihydrochloride and peroxidase and a suitable buffer. It can be used in any of the procedures described in Examples I to XIII. This composition when moistened with a solution containing D-aspartic acid will develop a blue color. This is a specific test for D-aspartic acid.

Example XXIII

Liver aldehyde oxidase (prepared from mammalian liver) is mixed with orthotolidine dihydrochloride and peroxidase and a suitable buffer. This composition can be used in any of the procedures described in Examples I to XIII. The composition when treated with a solution containing various aliphatic or aromatic aldehydes will develop a blue color.

Example XXIV

Edson's Flavin Enzyme (prepared from *Mycobacterium phlei*) is mixed with orthotolidine dihydrochloride, peroxidase and a suitable buffer. This composition can be used in any of the ways suggested in Examples I to XIII. The composition when moistened with a solution containing lactic acid will develop a blue color.

This application is a continuation-in-part of my copending applications Serial No. 422,977, filed April 13, 1954, and Serial No. 514,395, filed June 9, 1955, now abandoned.

What is claimed is:

1. A composition for detecting L-amino acid in an unknown which comprises L-amino oxidase, peroxidase, and an indicator which is oxidized by hydrogen peroxide in the presence of peroxidase and undergoes a color reaction during such oxidation.

2. A composition for detecting D-amino acid in an unknown which comprises D-amino oxidase, peroxidase, and an indicator which is oxidized by hydrogen peroxide in the presence of peroxidase and undergoes a color reaction during such oxidation.

3. A composition for detecting a member of the group consisting of hypoxanthine and xanthine in an unknown which comprises xanthine oxidase, peroxidase, and an indicator which is oxidized by hydrogen peroxide in the presence of peroxidase and undergoes a color reaction during such oxidation.

4. A composition for detecting glycine in an unknown which comprises glycine oxidase, peroxidase, and an indicator which is oxidized by hydrogen peroxide in the presence of peroxidase and undergoes a color reaction during such oxidation.

5. A composition for detecting monoamines in an unknown which comprises monoamine oxidase, peroxidase, and an indicator which is oxidized by hydrogen peroxide in the presence of peroxidase and undergoes a color reaction during such oxidation.

6. A composition for detecting diamines in an unknown which comprises diamine oxidase, peroxidase, and an indicator which is oxidized by hydrogen peroxide in the presence of peroxidase and undergoes a color reaction during such oxidation.

7. A composition for detecting uric acid in an unknown which comprises uricase, peroxidase, and an indicator which is oxidized by hydrogen peroxide in the presence of peroxidase and undergoes a color reaction during such oxidation.

8. A composition for detecting luciferin in an unknown which comprises luciferase, peroxidase, and an indicator which is oxidized by hydrogen peroxide in the presence of peroxidase and undergoes a color reaction during such oxidation.

9. A composition for detecting D-aspartic acid in an unknown which comprises D-aspartic acid oxidase, peroxidase, and an indicator which is oxidized by hydrogen peroxide in the presence of peroxidase and undergoes a color reacton during such oxidation.

10. A composition for detecting an aldehyde selected from the group consisting of aliphatic aldehydes and aromatic aldehydes in an unknown which comprises liver aldehyde oxidase, peroxidase, and an indicator which is oxidized by hydrogen peroxide in the presence of peroxidase and undergoes a color reaction during such oxidation.

11. A composition for detecting lactic acid in an unknown which comprises Edson's flavin enzyme, peroxidase, and an indicator which is oxidized by hydrogen peroxide in the presence of peroxidase and undergoes a color eraction during such oxidation.

References Cited in the file of this patent

UNITED STATES PATENTS 2,848,308    Free   Aug. 19, 1958

FOREIGN PATENTS 203,451    Australia   Sept. 27, 1956

OTHER REFERENCES

Still et al., "Studies on the Cyclophorase System VII—Aspartic Oxidase," J. Biological Chem., vol. 179, 1949, pages 831–837.

"Oxidase Reactions in Human Plasma Caused by Coeruloplasmin," by Holmberg et al., 1951, Scandinavian J. of Clin. and Lab. Investn., vol. 3, pages 103–107.

"Investigations in Serum Copper III Coeruloplasmin as an Enzyme," by Holmberg et al., 1951, Acta Chemica. Scandinavian, vol. 5, pages 476–480.

Summer et al., "The Enzymes," vol. II, part I, New York, Academic Press, 1951, pages 356 and 536.

West and Todd, "Textbook of Biochemistry," publ. by MacMillan Co., New York, 1952, page 1062.

Colowick et al., "Methods in Enzymology," vol. I, New York, Academic Press, 1955, page 523.

Colowick et al., "Methods in Enzymology," vol. II, New York, Academic Press, 1955, pages 199, 204, 394, 482, and 485.